April 25, 1933.  R. F. PEO  1,905,496
SHIFTING DEVICE
Filed June 9, 1931  2 Sheets-Sheet 2
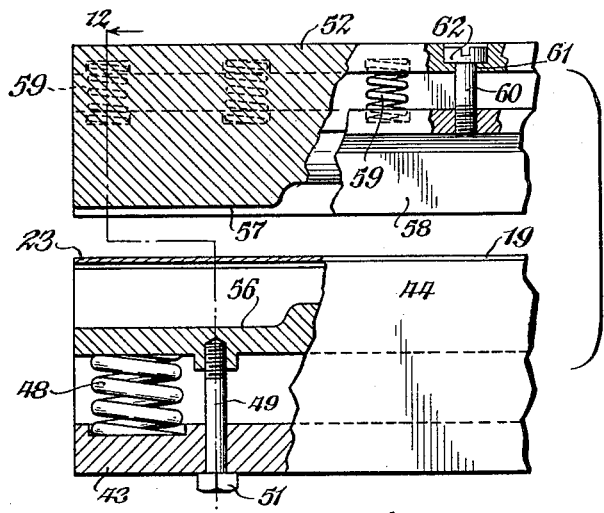
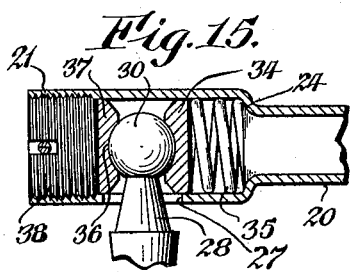
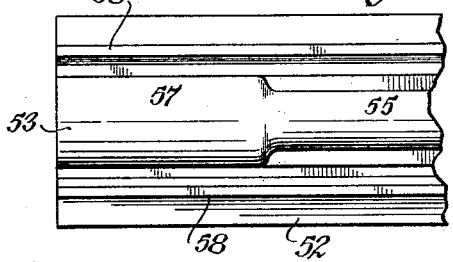
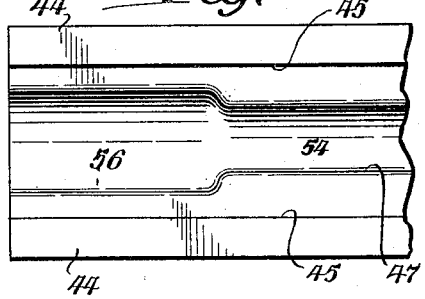
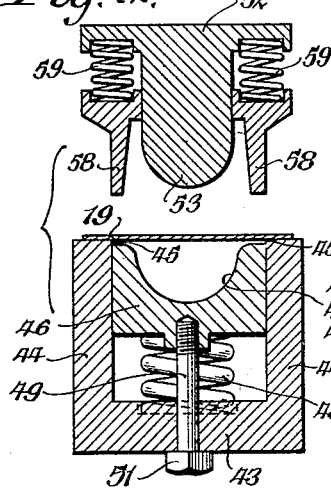
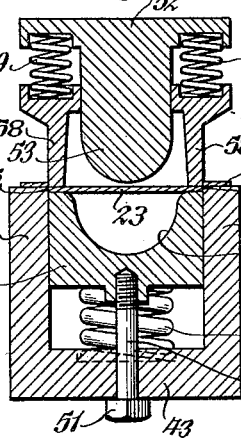
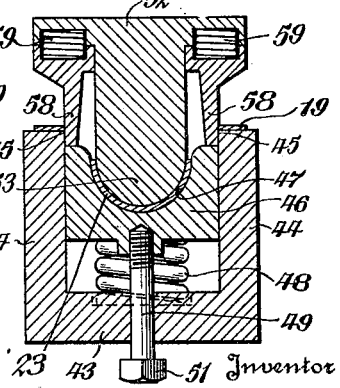
Ralph F. Peo
By Popp & Powers
Attorneys Patented Apr. 25, 1933

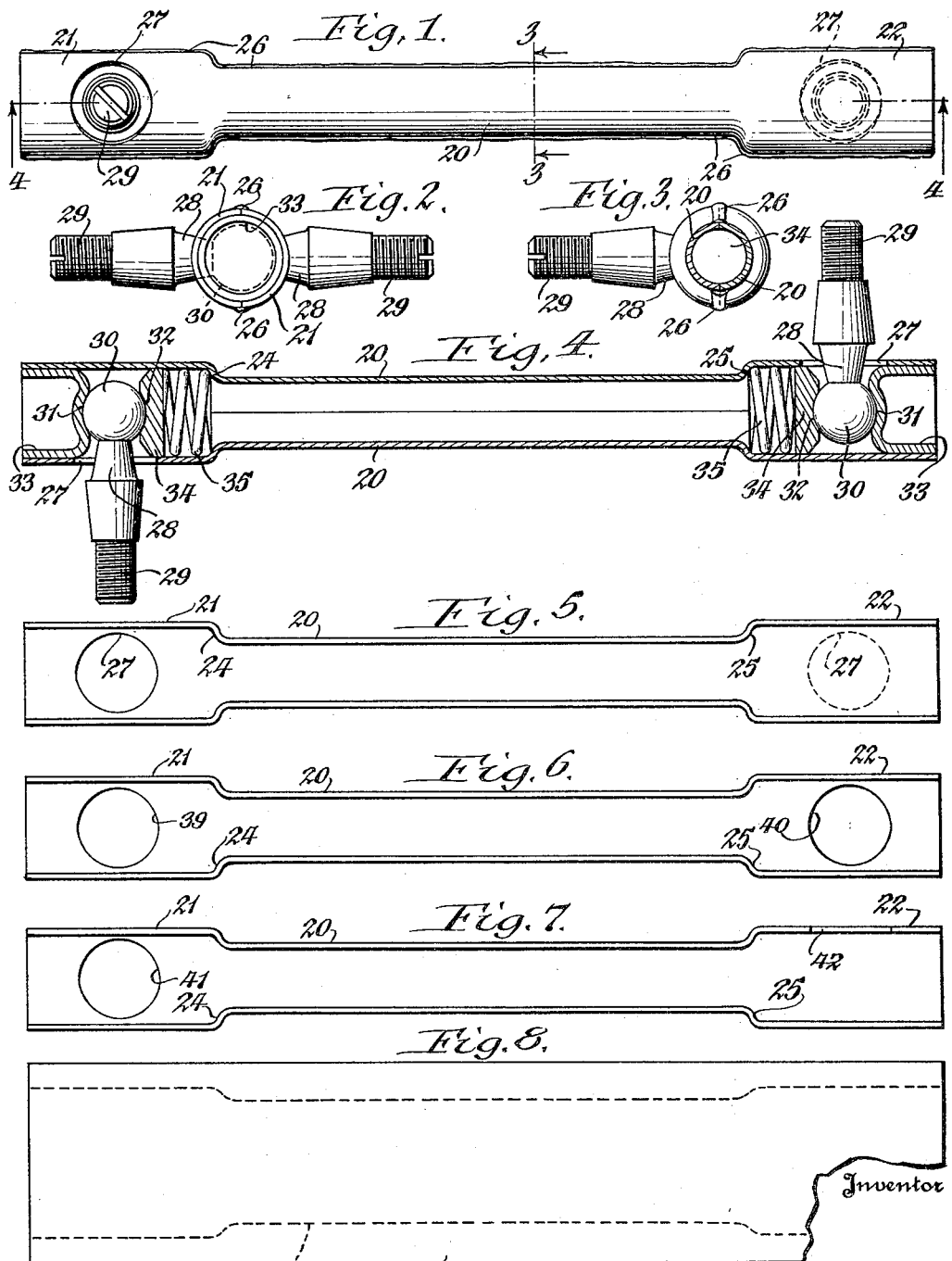

1,905,496

UNITED STATES PATENT OFFICE

RALPH F. PEO, OF BUFFALO, NEW YORK, ASSIGNOR TO HOUDE ENGINEERING CORPORATION, OF BUFFALO, NEW YORK, A CORPORATION OF NEW YORK

SHIFTING DEVICE

Application filed June 9, 1931. Serial No. 543,068.

This invention relates to an improved shifting device which can be used either as a drag link for shock absorbers and as rods for use in steering gears and brake mechanisms.

It is the purpose of this invention to produce a shifting device of this character which is simple in construction, strong and durable and capable of being manufactured at low cost.

In the accompanying drawings:

Figure 1 is a side elevation of one form of shifting device assembled with other parts for use as a drag link in shock absorbers.

Figure 2 is an end view of the same.

Figure 3 is a cross section taken on line 3—3, Fig. 1.

Figure 4 is a longitudinal section taken on line 4—4, Fig. 1.

Figure 5 is an inside elevation of one of the half-sections forming the tube shown in Figs. 1 and 4.

Figures 6 and 7 are similar views showing modified forms of the same.

Figure 8 is a plan view of a sheet of metal from which a blank is cut for making a half-section of a drag link.

Figure 9 is a fragmentary side view, partly in section showing the construction of the forming mechanism whereby the half-sections of the body of the shifting device are made in accordance with this invention.

Figures 10 and 11 are bottom plan and top plan views respectively of the upper and lower dies shown in Fig. 9.

Figure 12 is a vertical cross section of the forming mechanism in its open position on line 12—12, Fig. 9.

Figures 13 and 14 are similar views showing the dies in partially closed and completely closed positions, respectively.

Figure 15 is a fragmentary longitudinal section similar to Fig. 4, showing another form of bearing for the ball forming parts of the pivotal connection between the tubular body and another member.

In the following description similar characters of reference indicate like parts in the several figures of the drawings.

The shifting device forming the subject of this invention may either be so formed that the same may be pivotally connected at both ends with other parts, as, for example, when used as a drag link between the operating arm of a shock absorber and a bracket on the axle of an automobile, or the same may be so constructed that only one end thereof is pivotally connected with another member while its opposite end is connected by a screw joint or otherwise with some other member, as would be the case when used as a connecting rod for a steering gear or brake mechanism.

The particular form of the invention shown in Figs. 1–4 is organized for use as a drag link for shock absorbers and is constructed as follows:

In its general organization the connecting tube shown in Figs. 1–4 comprising an intermediate body portion 20 of relatively small diameter and two heads 21, 22, at opposite ends of the body which are larger in diameter than the body. This body and the heads are constructed of two semi-tubular or half-tube sections which have their longitudinal edges engaging one another and connected so that the same produce a complete tube. Each of the half-tube sections is stamped from a flat sheet metal blank 23 shown by dotted lines in Fig. 8 from a sheet of metal 19 by suitable mechanism to be hereinafter explained and when two of such sections are assembled a tube is produced having outwardly facing internal shoulders 24, 25 between the body and heads of the connecting tube. The connection between the longitudinal edges of the half-tube sections may be effected in any suitable manner by either electric arc welding the opposing edges of the sections together the whole length of these joints, as shown at 26 in Figs. 1, 2 and 3, or by acetylene welding these joints the whole length thereof by welding the joints between the half-tube sections only along the heads thereof where the greatest strain occurs, or by seaming, pressing or otherwise connecting these sections.

The connecting tube shown in Figs. 1 and 5 is adapted to be pivotally connected at one end with another member on one side of the tube and to be pivotally connected on the opposite side of its other end with another member for which purpose one of the half heads of each tube section is provided with a whole eye or opening 27, and the two sections are assembled so that the perforated half-head of each section is arranged diametrically opposite the non-perforated half-head of the other section, and parallel with the axis of the first mentioned eye.

Any suitable means may be provided for connecting each end of the connecting tube with other parts which means as shown in Figs. 1–4 may be constructed as follows:

Projecting laterally through each of the openings 27 is the neck 28 of a coupling member whose outer end is provided with a threaded shank 29 forming part of the means for securing the same to one of the relatively movable parts between which the drag link is interposed while the inner end of the shank is provided with a ball 30 arranged within the respective head of the coupling tube. The front and rear sides of the ball 30 are engaged respectively by spherical bearings 31, 32 formed respectively on the inner end of a cup shaped bushing 33 and a disk 34. The bushing may be secured in the front end of the respective head by electric arc or acetylene welding or otherwise and the disk is yieldingly pressed toward the ball by a spring 35 arranged within the rear part of the respective head and interposed between the disk 34 and the ball therein.

Instead of forming the front bearing 31 on a bushing 33 which is permanently secured to the respective head an outer bearing 36 may be formed on outer disk 37 which is adjustably supported in its operative position by a screw plug 38 engaging with an internal screw thread in the outer or front end of the respective coupling head, as shown in Fig. 15.

If desired, the two eyes, openings or holes for the reception of the necks of the pivotal connections may both be formed in the half-head of the same half-tube section, as shown at 39, 40, in Fig. 6, while the heads of the companion half-tube section has both of its heads imperforate in which case the shanks of the respective pivotal connections are arranged parallel and project laterally from the heads of the coupling tube on the corresponding sides thereof and thus enable this construction to be used where this particular organization is required.

When a particular installation requires the pivotal connections to be arranged at right angles to one another then one eye or opening may be formed wholly in the half-head of one tube section, as shown at 41 in Fig. 7, and the other eye or opening in the other head may be formed by means of a half-hole 42 in each of the corresponding longitudinal edges of the respective head, as shown in Fig. 7.

When the coupling or connecting tube is to be used for purposes which require a pivotal connection only at one end of the tube, such for example as the shifting rods of steering gears or brake mechanism, then the coupling head and the pivotal associated therewith at one end of the coupling tube is omitted and the respective end of the coupling tube may be provided instead with other appropriate means suitable for the particular installation.

Although the sections of this coupling tube may be produced in various ways and by different means, it is preferable to make the same by the forming mechanism which is shown in Figs. 9–14, and constructed as follows:

The numeral 43 represents a lower stationary base which is provided at its opposite longitudinal edges with upwardly projecting cutter blades or flanges 44 each of which has a cutting edge 45 at its inner upper corner, as shown in Figs. 12, 13 and 14. Arranged between the inner sides of the flanges 44 and guided by the latter is a vertically movable lower concave forming die 46 which is provided on its upper side with a longitudinal groove 47 of semi-cylindrical form in cross section. This lower forming die is yieldingly held in its elevated position by one or more springs 48 interposed between the base 43 and the underside of the lower forming die and the upward movement of this die is limited so that its upper edges flush with the top of the flanges 44 by means of one or more vertical stop bolts 49 each sliding in a vertical opening 50 in the base 43 and secured at upper end to the lower die and adapted to engage the head 51 and its lower end with the underside of this base.

The numeral 52 represents a vertically movable follower arranged above the lower base, flanges and die and adapted to be raised and lowered in any suitable manner. Arranged lengthwise on the underside of th follower is an upper convex forming die 53 the lower face of which is of semi-cylindrical form in cross section and adapted to co-operate with the face of the lower concave forming die for bending a sheet of metal similar to the flat blank 23 into semi-tubular form. The intermediate parts 54, 55 of these dies are of comparatively small diameter while the corresponding parts 56, 57 at each end of the lower and upper forming dies are of larger diameter so as to convert the flat sheet metal blank placed between them into a half-tube section having a reduced intermediate body part and enlarged end head parts. On opposite sides of the upper forming die are arranged two longitudinal cutters or blades 58 which are adapted to co-operate with the cutting edges 45 of the blades or flanges 44 for trimming off the excess metal from opposite longitudinal edges of the blank preparatory to bending the same into semi-tubular form. Each of the upper cutters is yieldingly held in its depressed position relative to the upper forming die by one or more springs 59 interposed between the upper side of each cutter and the underside of the follower and the depression of these cutters is limited so that in the elevated position of the upper forming die the lowermost part of the latter will be in line with or slightly above the lower edges of the cutters. This stopping effect is produced in the present case by one or more stop bolts 60 each sliding in an opening 61 in an edge portion of the follower and secured at its lower end to the respective cutter while the head 62 at its upper end is adapted to engage with the top of the follower.

While the follower and upper die are in an elevated position the sheet of metal 19 is placed over the lower die and on the cutting flanges 44 of the base, as shown in Fig. 12. During the first part of the downward movement of the plunger and upper die the upper cutters first engage with the longitudinal edge portions of the metal sheet and press the latter downwardly with the lower die thereby causing a flat blank of metal to be cut from the sheet having a contour suitable for subsequently binding the blank into a semi-tubular form. This cutting is due to the shearing action of the outer lower corners of the upper cutters or flanges co-operating with the upper inner corners of the lower cutters or flanges. As the cutting is completed the blank is carried downwardly into engagement with the lower die, as shown in Fig. 13, but the upper die still remains with its lower side above the lower edges of the upper cutters, due to the springs 59 being stiff for this purpose. During the final part of the downward movement of the follower 52 and upper die move independently of the upper cutters whereby the upper die pushes the metal blank downwardly into the lower die and the edges of the blank are withdrawn from between the upper cutters and the lower die. After the upper die has pushed the blank fully into the lower die this blank is of semi-tubular shape, as shown in Fig. 14, and as the follower continues its descent with the upper cutters the lower die recedes, this being possible due to the yielding support of the lower die by the springs 48. As the follower is returned to its elevated position the upper cutters are lowered by the springs 59 and the lower die is raised by the springs 48 preparatory to removing the finished semi-tubular member and operating on another blank.

The operations of shearing the blank from a sheet of metal and stamping or punching the same into its final shape are performed by one stroke of upper die and associated parts relative to the lower die and associated parts, thereby expediting the manufacture and reducing the cost of producing shifting devices of this character.

I claim as my invention:

1. A drag link consisting of two similar semi-tubular sheet metal sections of increased radius at their outer ends, said sections being welded together along their longitudinal engaging edges, and bearing abutments in the form of sheet metal cups inserted into the ends of and between said sections and welded thereto to form additional means for securing said sections together.

2. A drag link consisting of two similar semi-tubular sheet metal sections of increased radius at their outer ends, said sections being welded together along their longitudinal engaging edges, and ball-seating members providing end closures for said link, said members being inserted into the ends and between the assembled sections and welded thereto.

In testimony whereof I hereby affix my signature.

RALPH F. PEO.